(12) United States Patent
Li et al.

(10) Patent No.: US 9,703,479 B2
(45) Date of Patent: Jul. 11, 2017

(54) INPUT METHOD AND DEVICE USING SAME

(71) Applicant: Xiaomi Inc., Beijing (CN)

(72) Inventors: Chuangqi Li, Beijing (CN); Fa Wang, Beijing (CN); Cheng Qian, Beijing (CN)

(73) Assignee: Xiaomi Inc., Beijing (CN)

( * ) Notice: Subject to any disclaimer, the term of this patent is extended or adjusted under 35 U.S.C. 154(b) by 121 days.

(21) Appl. No.: 14/300,539

(22) Filed: Jun. 10, 2014

(65) Prior Publication Data

US 2014/0351740 A1 Nov. 27, 2014

Related U.S. Application Data

(63) Continuation of application No. PCT/CN2014/072323, filed on Feb. 20, 2014.

(30) Foreign Application Priority Data

May 22, 2013 (CN) .......................... 2013 1 0192770

(51) Int. Cl.
| | | |
|---|---|---|
| *G06F 3/048* | (2013.01) | |
| *G06F 3/0488* | (2013.01) | |
| *G06F 3/0481* | (2013.01) | |
| *G06F 3/0484* | (2013.01) | |
| *G06F 3/023* | (2006.01) | |

(Continued)

(52) U.S. Cl.
CPC ........ *G06F 3/04886* (2013.01); *G06F 3/0233* (2013.01); *G06F 3/0236* (2013.01); *G06F 3/0481* (2013.01); *G06F 3/04842* (2013.01); *G06F 3/04883* (2013.01); *H04M 2250/22* (2013.01); *H04M 2250/70* (2013.01);
(Continued)

(58) Field of Classification Search
CPC combination set(s) only.
See application file for complete search history.

(56) References Cited

U.S. PATENT DOCUMENTS 6,212,412 B1* 4/2001 Rogers ................. G06F 3/0233
341/29
8,884,872 B2* 11/2014 Kushler ................ G06F 3/0233
345/156

(Continued)

FOREIGN PATENT DOCUMENTS

| CN | 101533267 A | 9/2009 |
|---|---|---|
| CN | 101634935 A | 1/2010 |

(Continued)

OTHER PUBLICATIONS

International Search Report of PCT/CN2014/072323, mailed from the State Intellectual Property Office of China on May 26, 2014.

(Continued)

*Primary Examiner* — Hien Duong
(74) *Attorney, Agent, or Firm* — Finnegan, Henderson, Farabow, Garrett & Dunner LLP

(57) ABSTRACT

An input method for use in a device, includes: receiving character input information; determining, based on the character input information, an inputted character and time information associated with an input operation; and selecting a state of the inputted character according to the time information and at least one predetermined time threshold value.

17 Claims, 7 Drawing Sheets

(51) Int. Cl.
*H04N 5/44* (2011.01)
*H04N 21/422* (2011.01)

(52) U.S. Cl.
CPC ..... *H04N 5/4403* (2013.01); *H04N 21/42215* (2013.01); *H04N 2005/4421* (2013.01)

(56) References Cited

U.S. PATENT DOCUMENTS

| | | | |
|---|---|---|---|
| 2007/0040813 A1* | 2/2007 | Kushler | G06F 3/0237 345/173 |
| 2007/0216659 A1 | 9/2007 | Amineh | |
| 2009/0213134 A1 | 8/2009 | Stephanick et al. | |
| 2010/0085313 A1* | 4/2010 | Rider | G06F 3/04886 345/173 |
| 2010/0225587 A1 | 9/2010 | Harada et al. | |
| 2010/0231521 A1 | 9/2010 | Nishimura | |
| 2010/0251176 A1* | 9/2010 | Fong | G06F 3/04886 715/821 |
| 2010/0333011 A1* | 12/2010 | Kornev | G06F 3/04886 715/773 |
| 2011/0018695 A1* | 1/2011 | Bells | G06F 3/016 340/407.2 |
| 2011/0037718 A1 | 2/2011 | Stephanick et al. | |
| 2011/0055753 A1* | 3/2011 | Horodezky | G06F 3/04883 715/810 |
| 2011/0302519 A1* | 12/2011 | Fleizach | G06F 3/03547 715/773 |
| 2011/0307822 A1* | 12/2011 | Park | G06F 3/04883 715/773 |
| 2012/0026115 A1 | 2/2012 | Tomoda | |
| 2012/0044175 A1 | 2/2012 | Cho | |
| 2012/0146910 A1* | 6/2012 | Griffin | G06F 1/1662 345/168 |
| 2012/0280931 A1 | 11/2012 | Stephanick et al. | |
| 2013/0182015 A1* | 7/2013 | Kuo | G06F 3/04812 345/660 |
| 2013/0326557 A1* | 12/2013 | Kang | G06F 3/0482 725/42 |
| 2014/0109020 A1* | 4/2014 | Wielgosz | G06F 3/04883 715/863 |
| 2014/0292727 A1* | 10/2014 | Kamata | G06F 3/0418 345/178 |
| 2015/0100911 A1* | 4/2015 | Yin | G06F 3/04883 715/773 |
| 2015/0113467 A1* | 4/2015 | Kim | G06F 3/04886 715/773 |

FOREIGN PATENT DOCUMENTS

| | | |
|---|---|---|
| CN | 101779441 A | 7/2010 |
| CN | 101930295 A | 12/2010 |
| CN | 102460350 | 5/2012 |
| CN | 102789335 | 11/2012 |
| CN | 102854996 | 1/2013 |
| CN | 103294222 | 9/2013 |
| EP | 1603013 B1 | 9/2008 |
| JP | 09-128148 | 5/1997 |
| JP | 2002-518721 A | 6/2002 |
| JP | 2004-206732 A | 7/2004 |
| JP | 2011-103125 A | 5/2011 |
| JP | 2012-032872 A | 2/2012 |
| JP | 2012-053921 A | 3/2012 |
| JP | 2012-108810 A | 6/2012 |
| KR | 10-2011-0058171 | 6/2011 |
| RU | 2285284 C2 | 10/2006 |
| RU | 2419833 C2 | 5/2011 |
| WO | WO 99/65212 A1 | 12/1999 |
| WO | WO 2009/022657 | 2/2009 |

OTHER PUBLICATIONS

Extended European Search Report of European Patent Application No. 14800866.7, from the European Patent Office, dated Oct. 5, 2016.

Partial supplemental European Search Report of European Patent Application No. 14800866.7, from the European Patent Office, dated Jun. 22, 2016.

\* cited by examiner

INPUT METHOD AND DEVICE USING SAME

CROSS REFERENCE TO RELATED APPLICATIONS

The present application is a continuation of International Application No. PCT/CN2014/072323, filed Feb. 20, 2014, which is based upon and claims priority to Chinese Patent Application No. 201310192770.6, filed May 22, 2013, the entire contents of all of which are incorporated herein by reference.

TECHNICAL FIELD

The present disclosure relates to an input method and a device using same.

BACKGROUND

Conventionally, there are two main input methods used in electronic devices to receive user input: a method based on a full keyboard on which each alphabet key corresponds to one letter, and a method based on a reduced keyboard on which multiple letters can correspond to one key. For example, a nine-square grid keyboard is a reduced keyboard. On the nine-square grid keyboard, the digit keys 1 through 9 are arranged in three rows by three columns. Each of the digit keys 1 through 9 may also correspond to multiple letters.

In the method based on the full keyboard, a user can input a letter by only clicking a corresponding alphabet key.

In the method based on the reduced keyboard, the user can input a letter by clicking a corresponding key multiple times, such that the letters indicated on the key are displayed sequentially, until the letter to be inputted is displayed for the user's selection.

Conventionally, a remote controller having four direction keys, including an up key, a down key, a left key, and a right key, and a confirm key may be used to input letters to a device. For example, a full keyboard or a reduced keyboard is displayed on a screen of the device. The user can select a letter to be inputted through the direction keys, and then confirm the selection by using the confirm key.

However, in both the method based on the full keyboard and the method based on the reduced keyboard, when selecting a state of the inputted character, such as the uppercase state and the lowercase state, the user generally needs to first press a "shift" key or a key having the similar function. When the user inputs a string of characters that needs to switched between the uppercase state and the lowercase state, efficiency of inputting characters will be reduced.

SUMMARY

According to a first aspect of the present disclosure, there is provided an input method for use in a device, comprising: receiving character input information; determining, based on the character input information, an inputted character and time information associated with an input operation; and selecting a state of the inputted character according to the time information and at least one predetermined time threshold value.

According to a second aspect of the present disclosure, there is provided a device, comprising: a processor; a memory for storing instructions executable by the processor; wherein the processor is configured to: receive character input information; determine, based on the character input information, an inputted character and time information associated with an input operation; and select a state of the inputted character according to the time information and at least one predetermined time threshold value.

According to a third aspect of the present disclosure, there is provided a non-transitory computer-readable medium having stored therein instructions that, when executed by a processor of a device, cause the device to perform an input method, the input method comprising: receiving character input information; determining, based on the character input information, an inputted character and time information associated with an input operation; and selecting a state of the inputted character according to the time information and at least one predetermined time threshold value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated into and constitute a part of the present specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

Figure 1:
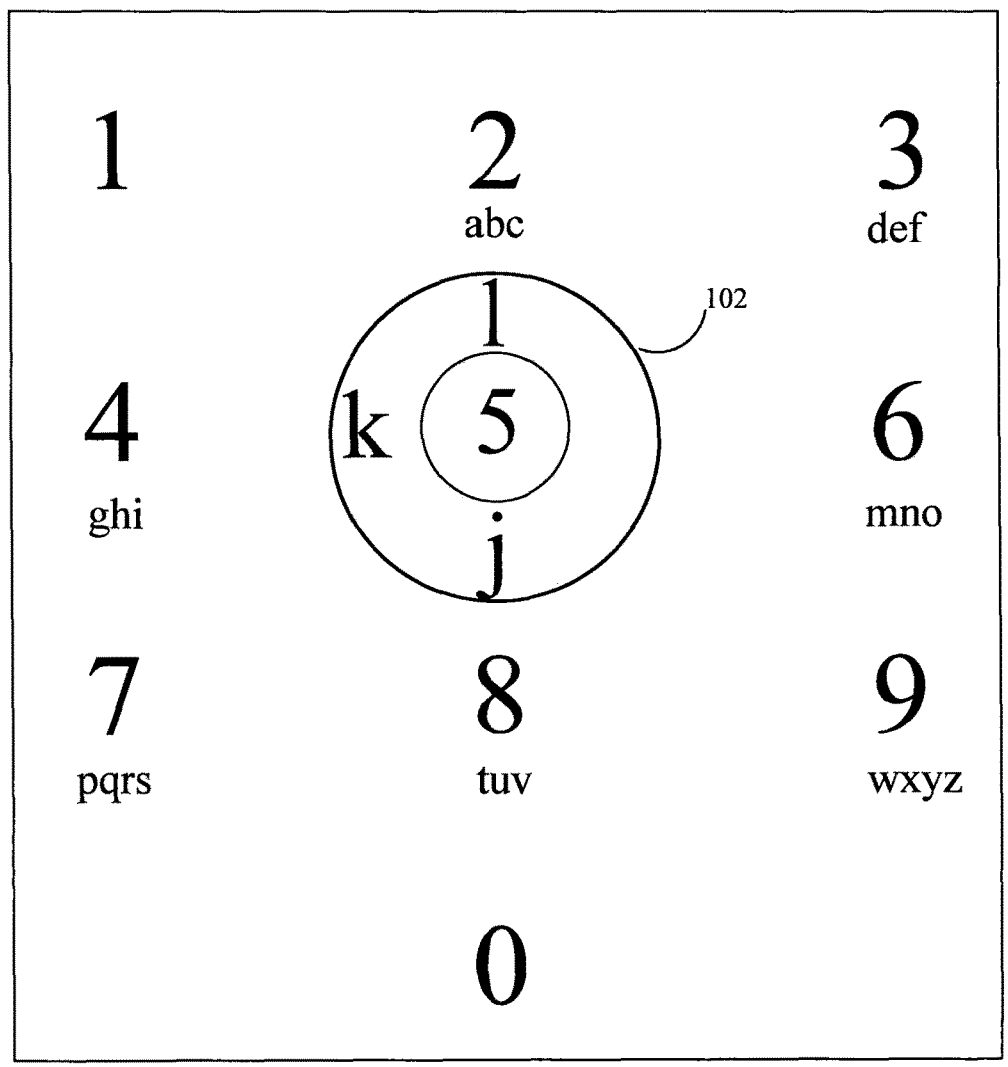
FIG. 1 is a schematic diagram of a keyboard displayed on a device, according to an exemplary embodiment.

FIG. 1 is a schematic diagram of a keyboard 100 displayed on a device, according to an exemplary embodiment. For example, the device may be controlled by a remote controller including one or more direction keys, such as up, down, left, and right keys, and a confirm key. Through the remote controller, a character, such as a letter, on the keyboard 100 may be selected and inputted into the device using input methods described below. Also for example, the device may have a touch screen. Through a touch operation on the device, a character, such as a letter, on the keyboard 100 may be selected and inputted into the device using input methods described below.

Referring to FIG. 1, in the illustrated embodiment, the keyboard 100 is a nine-square-grid keyboard. On the keyboard 100, the numeric keys 1 through 9 are arranged in three rows by three columns. Each of the digit keys may also correspond to one or more characters, such as letters, displayed on the numeric key. For example, when the confirm key on the remote controller is pressed, the keyboard 100 may be displayed on the device. In addition, an input cursor (not shown) may select a numeric key, such as the numeric key "5," by default, and a temporary keyboard 102 may further be displayed on the keyboard 100 at the location of the selected numeric key. For example, the temporary keyboard 102 displays characters corresponding to the selected numeric key in a predetermined layout, such as above, below, to the left of, or to the right of the selected digit key.

Referring to FIG. 1, in the illustrated embodiment, if a user wants to select the character "1" displayed above the digit "5," the user can press the up key on the remote controller. Similarly, if the user wants to select the character "k" displayed to the left of the digit "5," the user can press the left key on the remote controller; and if the user wants to select the character "j" displayed below the digit "5," the user can press the down key on the remote controller. The temporary keyboard 102 will disappear when the character is inputted successfully.

In exemplary embodiments, the numeric keys on the keyboard 100 are selected by pressing the direction keys on the remote controller. After a numeric key is selected on the keyboard 100 and the confirm key on the remote controller is pressed, the temporary keyboard 120 pops up.

In exemplary embodiments, a state of the displayed character being inputted, such as a lowercase state or an uppercase state, may be selected based on a magnitude relationship between time information associated with an input operation and a predetermined time threshold value. For example, the user can press the up key for additional time, e.g., a few seconds, to input the uppercase character "L" instead of the lowercase character "l" in the above illustrated embodiment. Similarly, if the current state of the displayed character being inputted is the uppercase state, the user can press the up key for additional time, e.g., a few seconds, to switch to the lowercase character "l."

Figure 2:
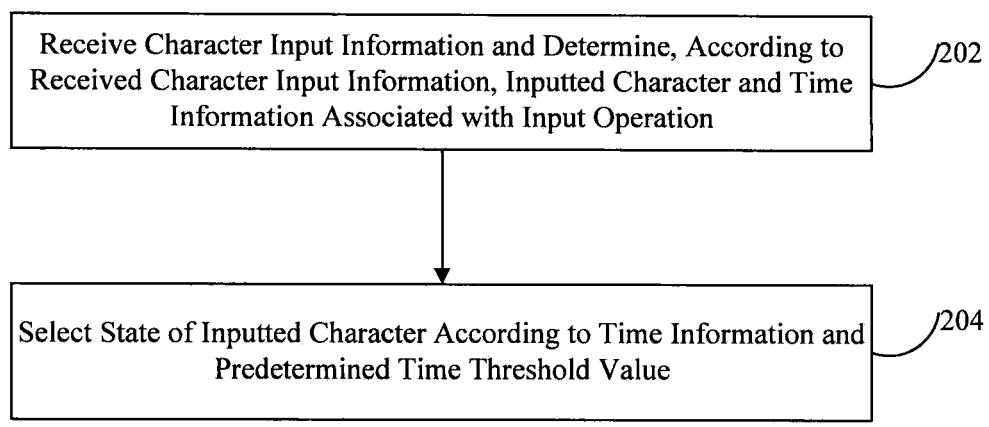
FIG. 2 is a flowchart of an input method, according to an exemplary embodiment.

FIG. 2 is a flowchart of an input method 200 for use in a device, according to an exemplary embodiment. Referring to FIG. 2, the method 200 includes the following steps.

In step 202, the device receives character input information and determines, according to the received character input information, an inputted character and time information associated with a character input operation. The inputted character may be, e.g., a letter, a symbol, etc.

In exemplary embodiments, the character input information is information generated by the character input operation. For example, if the character input operation is a pressing operation on a physical key of a remote controller of the device, the character input information includes key information generated by pressing the physical key, which may be represented by a series of codes. Also for example, if the character input operation is a touch operation on a touch screen of the device, the character input information includes coordinate information of the touch operation.

In exemplary embodiments, the time information associated with the character input operation may be a key dwell time or a touch operation dwell time of the character input operation. The key dwell time and the touch operation dwell time are generally each a continuous time period. For example, if the character input operation is the pressing operation on a physical key, the time information may be a dwell time during which the physical key is pressed. Also for example, if the character input operation is a touch operation, the time information may be a dwell time during which a point having the coordinate information of (x, y) on the touch screen is touched.

When the character input information includes the key information, the device may determine the character corresponding to the key information. When the character input information includes the coordinate information, the device may determine the character at the location corresponding to the coordinate information.

In step 204, the device selects a state of the inputted character, such as a lowercase state or an uppercase state, according to the time information and a predetermined time threshold value. For example, the time threshold value may be a time-scale value, such as a few seconds or tens of milliseconds, which may be set according to actual situations. The device compares the time information with the time threshold value, and selects the state of the inputted character based on a comparison result.

In exemplary embodiments, selecting the state of the inputted character may be one of maintaining a current state of the inputted character, or switching the current state of the inputted character to be another state. For example, when the time information is longer than, or equal to, the time threshold value, the input apparatus switches the current state of the inputted character to another state; and when the time indicated by the time information is shorter than the time threshold value, the device maintains the current state of the inputted character. In addition, when the time information reaches a predetermined length, in addition to switching the current state of the inputted character to another state, the input apparatus also locks the switched state such that subsequently inputted characters will maintain the switched state. By selecting the state of the inputted character according to the comparison result between the time information and the time threshold value, complicated operations for switching the state of inputted characters can be avoided, and efficiency of inputting characters can be improved.

Figure 3:
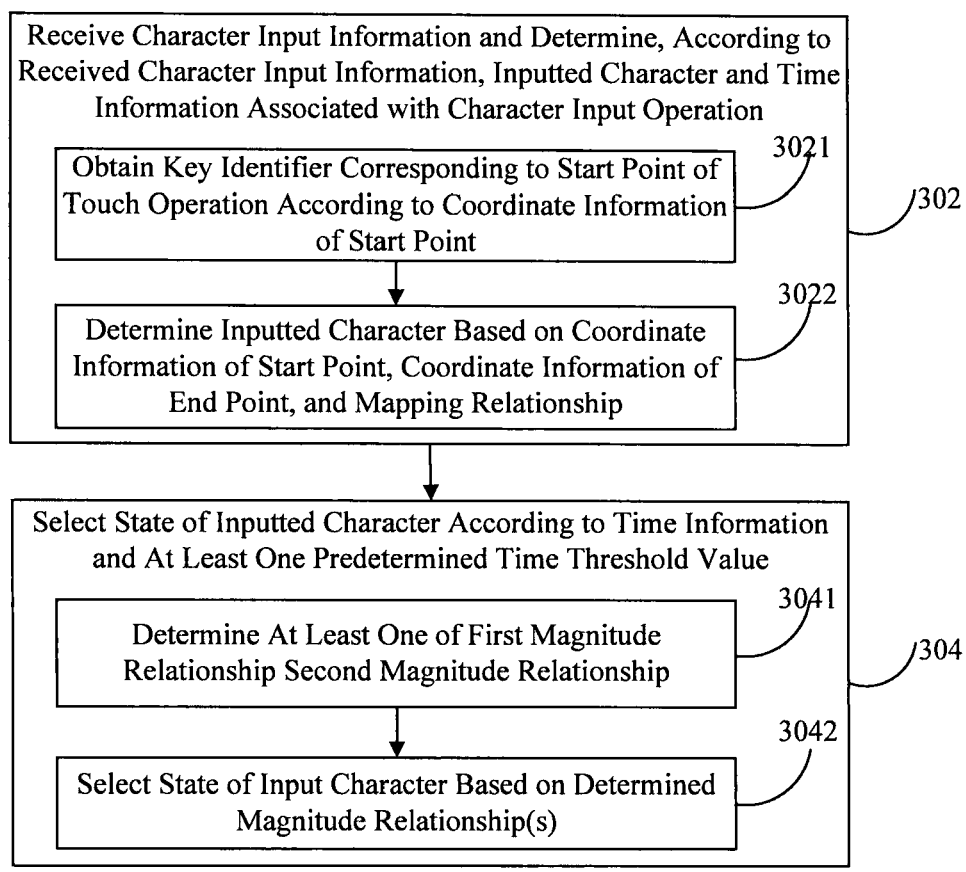
FIG. 3 is a flowchart of an input method, according to an exemplary embodiment.

FIG. 3 is a flowchart of an input method 300 for use in a device, according to an exemplary embodiment. Referring to FIG. 3, the method 300 includes the following steps.

In step 302, the device receives character input information and determines, according to the received character input information, an inputted character and time information associated with a character input operation.

In exemplary embodiments, the character input information may be generated by the character input operation, such as an operation of pressing a physical key on a controller of the device, or a touch operation on a touch screen of the device. When the character input information is generated by the touch operation, e.g., a sliding operation, the character input information may include coordinate information of a start point and an end point of the touch operation. Moreover, the time information associated with the character input operation may include a dwell time of the touch operation corresponding to the end point.

In one exemplary embodiment, the coordinate information of the start point of the touch operation is (100, 200), the coordinate information of the end point of the touch operation is (300, 400), and the touch operation continues for 2 seconds at a location corresponding to the end point with the coordinate information (300, 400). For illustrative purposes only, it will be assumed that the character input information is generated by the touch operation.

In exemplary embodiments, determining the inputted character includes sub-steps 3021 and 3022.

In sub-step 3021, the device obtains a key identifier corresponding to the start point of the touch operation according to the coordinate information of the start point. For example, the key identifier may be a number, a symbol, etc., displayed on a key of the keyboard 100 (FIG. 1).

In exemplary embodiments, a mapping relationship is predetermined between the key identifier and candidate characters. After obtaining the key identifier corresponding to the start point of the touch operation, the device determines the candidate characters corresponding to the key identifier, and a relative position relationship between the candidate characters and the key identifier in accordance with the mapping relationship between the identifier and the candidate characters. In one exemplary embodiment, the coordinate information of the start point is (100, 200), and the key identifier corresponding to the start point is the number "3." Accordingly, in accordance with the mapping relationship, the device determines that the candidate characters corresponding to the key identifier "3" are "d", "e," and "f," and that the candidate character "d" is to be displayed to the left of the key identifier "3", the candidate character "e" is to be displayed above the key identifier "3," and the candidate character "f" is to be displayed below the key identifier "3."

In sub-step 3022, the device determines the inputted character based on the coordinate information of the start point, the coordinate information of the end point, and the mapping relationship between the identifier and the candidate characters.

In exemplary embodiments, when the coordinate information of the start point and the coordinate information of the end point correspond to the same key identifier, the device determines a candidate character at a location of the end point as the inputted character. For example, the start point and the end point of a sliding operation respectively have the coordinate information (100, 200) and the coordinate information (100, 300), both of which correspond to the same key identifier "3." Accordingly, the device determines the candidate character "e" at the location of the end point as the inputted character.

In exemplary embodiments, when the coordinate information of the start point and the coordinate information of the end point correspond to different key identifiers, the device determines a candidate character that corresponds to the key identifier corresponding to the start point and that is passed by a sliding path between the start point and the end point as the inputted character. For example, the start point and the end point of a sliding operation respectively have the coordinate information (100, 200) and the coordinate information (0, 0), which correspond to the key identifier "3" and the key identifier "8," respectively. Accordingly, the device determines the candidate character "f" that corresponds to the key identifier "3" corresponding to the starting point and that is passed by the sliding path between the start point and the end point as the inputted character.

In exemplary embodiments, to determine the time information associated with the input operation according to the character input information, the device reads out the time information from the character input information.

In step 304, the device selects a state of the inputted character according to the time information and at least one predetermined time threshold value. For example, step 304 may include sub-steps 3041 and 3042.

In sub-step 3041, the device determines at least one of a first magnitude relationship between the time information and a first predetermined time threshold value or a second magnitude relationship between the time information and a second predetermined time threshold value greater than the first predetermined time threshold value. For example, the first predetermined time threshold value is 2 seconds, and the second predetermined time threshold value is 5 seconds.

In one exemplary embodiment, the device determines the first magnitude relationship between the time information and the first predetermined time threshold value. For example, the time information is 1 second. In this case, the input apparatus determines that the time information is smaller than the first predetermined time threshold value.

In one exemplary embodiment, the device determines the second magnitude relationship between the time information and the second threshold value. For example, the time information is 6 seconds. In this case, the device determines that the time information is larger than the second predetermined time threshold value.

In one exemplary embodiment, the device determines both the first magnitude relationship and the second magnitude relationship. For example, the time information is 3 seconds. In this case, the device determines that the time information is larger than the first predetermined time threshold value and is smaller than the second predetermined time threshold value.

In sub-step 3042, the device selects a state of the input character based on the determined magnitude relationship(s).

In one exemplary embodiment, when it is determined that the time information is smaller than the first predetermined time threshold value, the device maintains a current state of the inputted character. For example, if the current state of the inputted character is a first state, such as the lowercase state, the input apparatus maintains the current state of the inputted character to be the first state.

In one exemplary embodiment, when it is determined that the time information is greater than or equal to the predetermined time first threshold value and is smaller than the second predetermined time threshold value, the device switches the state of the inputted character. For example, if the current state of the character is the first state, the device switches the state of the character to a second state, such as the uppercase state.

In one exemplary embodiment, when it is determined that the time information is greater than or equal to the second predetermined time threshold value, the device switches the state of the character, and also locks the state of a subsequently inputted character to be the switched state. For example, if the current state of the inputted character is the first state, the device switches the state of the inputted character to the second state, i.e., the uppercase state in this embodiment, and locks the state of one or more subsequently inputted characters to be the uppercase state, which can be unlocked by, e.g., a predetermined user operation.

Figure 4:
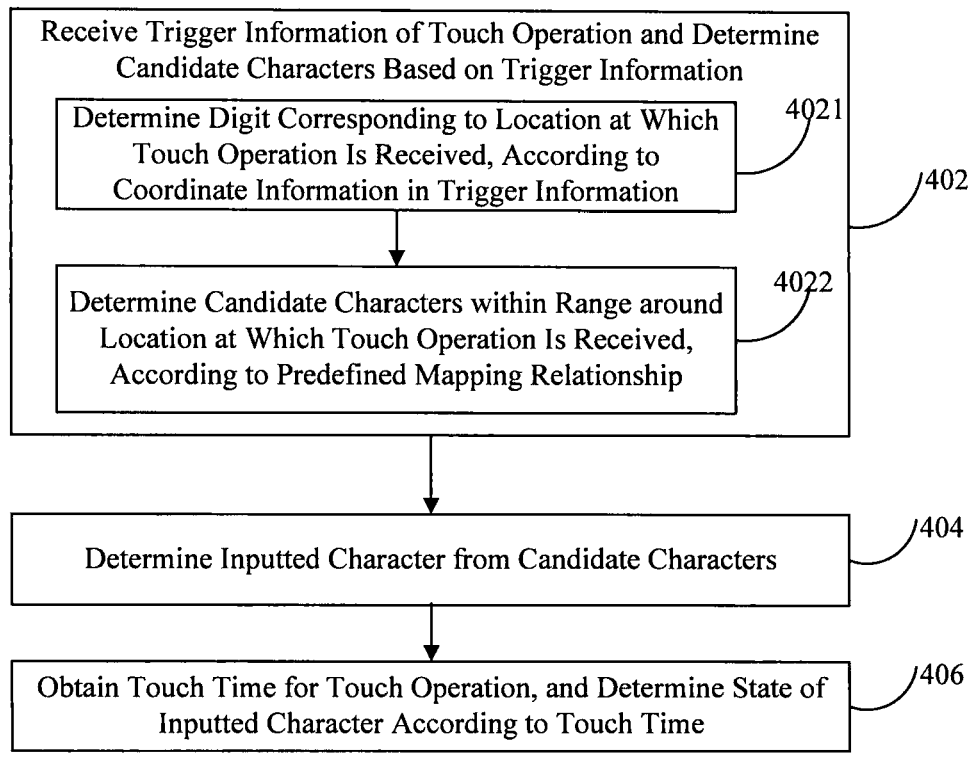
FIG. 4 is a flowchart of an input method, according to an exemplary embodiment.

FIG. 4 is a flowchart of an input method 400 for use in a device, according to an exemplary embodiment. The method 400 may be implemented based on an operation of pressing a physical key on a controller of the device, or a touch operation on a touch screen of the device. For illustrative purposes only, it is assumed that the method 400 is implemented based on the touch operation. Referring to FIG. 4, the method 400 includes the following steps.

In step 402, the device receives trigger information of a touch operation on the touch screen, and determines candidate characters based on the trigger information. For example, the trigger information includes coordinate information of the touch operation. Step 402 may include sub-steps 4021 and 4022.

In sub-step 4021, the device determines a digit corresponding to a location at which the touch operation is received, according to the coordinate information in the trigger information.

In sub-step 4022, the device determines candidate characters within a range around the location at which the touch operation is received, according to a predefined mapping relationship between the digit and the candidate characters. The digit may correspond to one or more candidate characters.

In step 404, the device determines the inputted character from the candidate characters, according to direction information in the trigger information. For example, a start point of the touch operation corresponds to the digit, and a stop position of the touch operation is an end point. The device determines, as the inputted character, the candidate character based on a direction from the start point to the end point.

In step 406, the device obtains a touch time for the touch operation, and determines a state of the inputted character according to the touch time. For example, a lowercase state, an uppercase state, and a locked state may be predefined.

In one exemplary embodiment, if the touch time is shorter than a first predetermined time threshold value, e.g., 2 seconds, the device determines the state of the inputted character to be the lowercase state. If the touch time is longer than or equal to the first predetermined time threshold value and shorter than a second predetermined time threshold value, e.g., 5 seconds, the device determines the state of the inputted character to be the uppercase state. If the touch time is longer than or equal to the second predetermined time threshold value, the device determines the state of the inputted character to be the uppercase state, and also locks the state of the character to be the uppercase state, such that the state of a subsequently inputted character is to be the locked state, i.e., the uppercase state in this embodiment.

In one exemplary embodiment, if the touch time is shorter than a first predetermined time threshold value, e.g., 2 seconds, the device determines the state of the inputted character to be the uppercase state. If the touch time is longer than or equal to the first predetermined time threshold value and shorter than a second predetermined time threshold value, e.g., 5 seconds, the device determines the state of the inputted character to be the lowercase state. If the touch time is longer than or equal to the second predetermined time threshold value, the device determines the state of the inputted character to be the lowercase state, and also locks the state of the character to be the lowercase state, such that the state of a subsequently inputted character is to be the locked state, i.e., the lowercase state in this embodiment.

Figure 5:
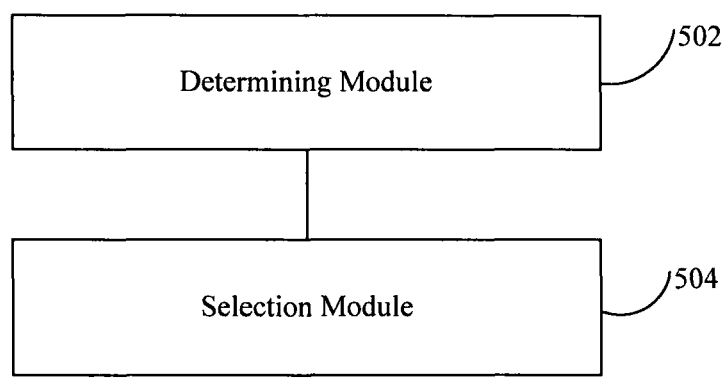
FIG. 5 is a block diagram of an input apparatus, according to an exemplary embodiment.

FIG. 5 is a block diagram of an input apparatus 500, according to an exemplary embodiment. Referring to FIG. 5, the input apparatus includes a determining module 502 and a selection module 504. The determining module 502 and the selection module 504 are configured to perform steps 202 and 204, respectively, in the method 200 (FIG. 2). For example, the determining module 502 is configured to receive character input information and determine, according to the character input information, an inputted character and time information associated with a character input operation. Also for example, the selection module 504 is configured to select a state of the inputted character based on the time information and a time threshold value.

Figure 6:
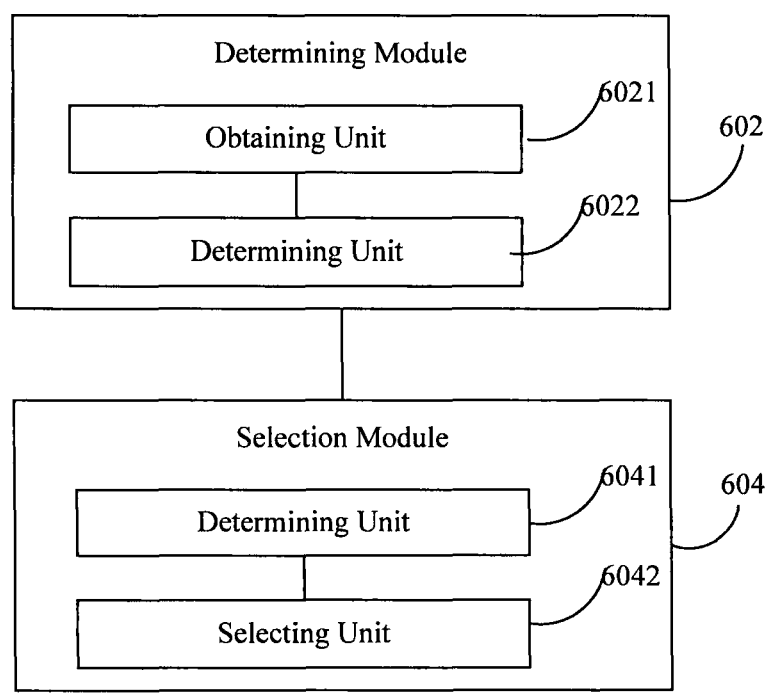
FIG. 6 is a block diagram of an input apparatus, according to an exemplary embodiment.

FIG. 6 is a block diagram of an input apparatus 600, according to an exemplary embodiment. Referring to FIG. 6, the input apparatus 600 includes a determining module 602 and a selection module 604. The determining module 602 is configured to receive character input information and determine, according to the character input information, an inputted character and time information associated with a character input operation. The selection module 604 is configured to select a state of the inputted character based on the time information and a time threshold value.

In exemplary embodiments, the determining module 602 includes an obtaining unit 6021 and a determining unit 6022, and the selection module 604 includes a determining unit 6041 and a selecting unit 6042.

The obtaining unit 6021 is configured to obtain a key identifier corresponding to coordinate information of a start point of a touch operation, similar to the description above in connection with FIGS. 3 and 4. The determining unit 6022 is configured to determine the inputted character based on the coordinate information of the start point, coordinate information of an end point of the touch operation, and a mapping relationship between the key identifier and candidate characters, also similar to the description above in connection with FIGS. 3 and 4.

The determining unit 6041 is configured to determine at least one of a first magnitude relationship between the time information and a first threshold value or a second magnitude relationship between the time information and a second threshold value, similar to the description above in connection with FIGS. 3 and 4. The selecting unit 6042 is configured to maintain a state of the inputted character when the time information is smaller than the first threshold value, to switch the state of the inputted character when the time information is greater than or equal to the first threshold value and smaller than the second threshold value, and to switch the state of the character and lock the state of a subsequently inputted character to be the switched state when the time information is greater than or equal to the second threshold value, also similar to the description above in connection with FIGS. 3 and 4.

Moreover, the input apparatus 600 may further include a storage (not shown) for storing the mapping relationship between the key identifier and the candidate characters, and the inputted character and the state of the inputted character. When the same character is inputted again, the same character of a different state may be read out directly from the storage for quick selection. A character string containing the same character may also be read out directly from the storage, and the character string can be formed by a plurality of characters of various states, such as a phrase or a sentence.

The storage may be implemented with a memory residing on a client side or a server side, or with first and second memories on the client side and the server side, respectively. Moreover, character information and the like stored in the first memory on the client side may be synchronized with character information and the like stored in the second memory on the server side.

One of ordinary skill in the art will understand that the above described modules/units can each be implemented by hardware, or software, a combination of hardware and software. One of ordinary skill in the art will also understand that multiple ones of the above described modules/units may be combined as one module/unit, and each of the above described modules/units may be further divided into a plurality of sub-modules/sub-units.

Figure 7:
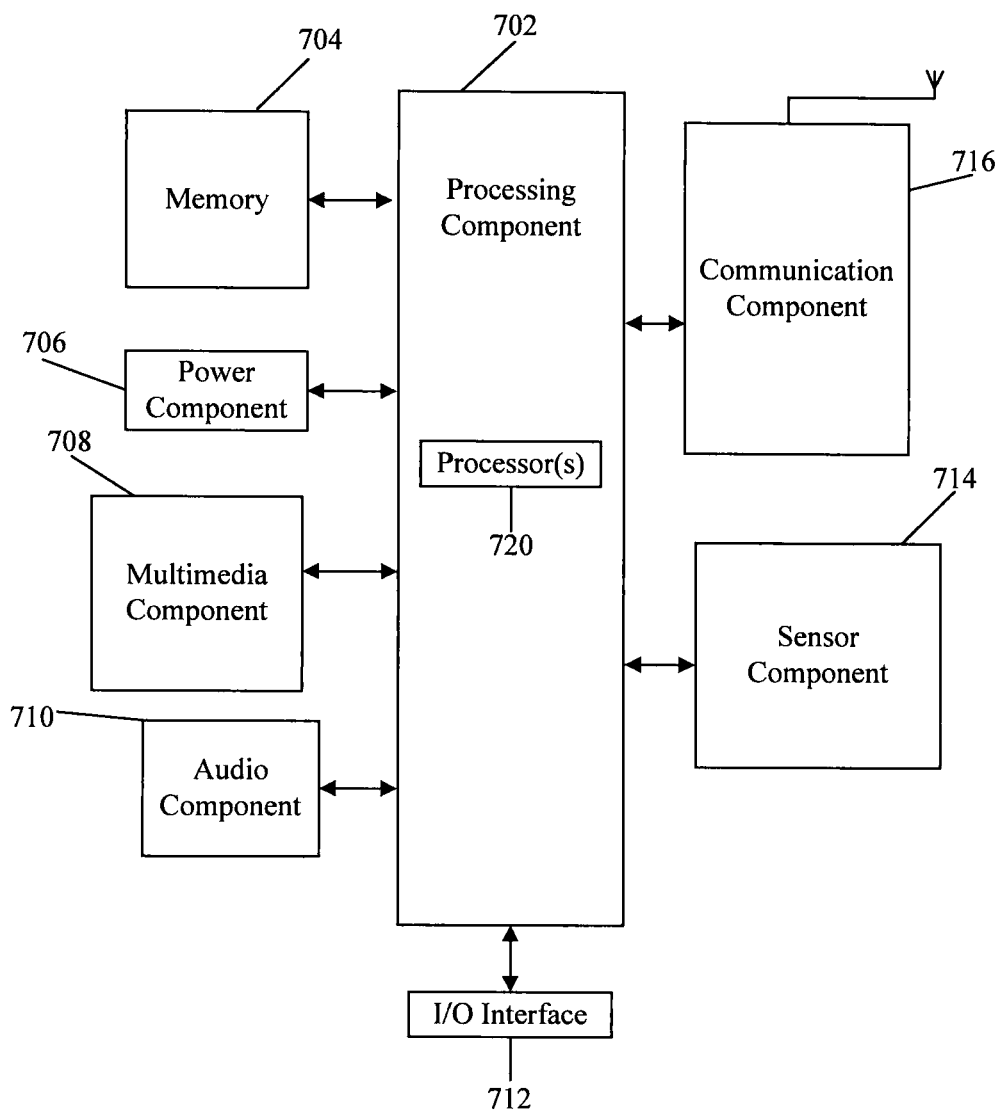
FIG. 7 is a block diagram of a device, according to an exemplary embodiment.

FIG. 7 is a block diagram of a device 700, according to an exemplary embodiment. For example, the device 700 may be a television that can be controlled through a remote controller, a mobile phone, a computer, a digital broadcast terminal, a messaging device, a gaming console, a tablet, a medical device, exercise equipment, a personal digital assistant, and the like. The device 700 is configured to perform any of the above-described input methods. Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described input methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, videos, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 performs power management for various components of the device 700. The power component 706 may include a power management system, and any other components associated with the management and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, or a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a complementary metal-oxide-semiconductor (CMOS) or charge-coupled device (CCD) image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described input methods.

In exemplary embodiments, there is also provided a non-transitory computer-readable storage medium including instructions, such as included in the memory 704, executable by the processor 702 in the device 700, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. An input method for use in a device, comprising:
receiving character input information;
determining, based on the character input information, an inputted character and time information associated with an input operation, the time information being one of a key dwell time or a touch operation dwell time of the input operation; and
selecting a representation form of the inputted character according to the time information and at least one predetermined time threshold value, wherein when the at least one predetermined time threshold value includes a first threshold value and a second threshold value greater than the first threshold value, the selecting of the representation form of the inputted character further includes:
determining at least one of a first magnitude relationship between the time information and the first threshold value or a second magnitude relationship between the time information and the second threshold value;
when the time information is smaller than the first threshold value, maintaining a representation form of the inputted character;
when the time information is greater than or equal to the first threshold value and is smaller than the second threshold value, switching the representation form of the inputted character; and
when the time information is greater than or equal to the second threshold value, switching the representation form of the inputted character, and locking a representation form of a subsequently inputted character to be the switched representation form.

2. The method according to claim 1, further comprising:
generating the character input information based on a touch operation, the generated character input information including coordinate information of a start point and an end point of the touch operation, the time information including a dwell time of the touch operation corresponding to the end point.

3. The method according to claim 2, wherein the determining of the inputted character comprises:
obtaining a key identifier corresponding to the start point of the touch operation; and
determining the inputted character according to the coordinate information of the start point, the coordinate information of the end point, and a predefined mapping relationship between the key identifier and one or more candidate characters.

4. The method according to claim 3, wherein the determining of the inputted character according to the coordinate information of the start point, the coordinate information of the end point, and the predefined mapping relationship comprises:
when the coordinate information of the start point and the coordinate information of the end point correspond to the same key identifier, determining a first candidate character at a location of the end point as the inputted character; and
when the coordinate information of the start point and the coordinate information of the end point respectively correspond to different key identifiers, determining a second candidate character that corresponds to the obtained key identifier corresponding to the start point and that is passed by a touch path between the start point and the end point, as the inputted character.

5. The method according to claim 1, wherein the determining of the time information associated with the input operation comprises:
reading out the time information from the character input information.

6. The method according to claim 1, wherein the receiving comprises:
displaying a keyboard, a first key on the keyboard corresponding to one number and multiple letters;
receiving a selection of the first key;
displaying, in response to the selection, multiple keys respectively corresponding to the multiple letters around a key corresponding to the number in a predetermined layout; and
receiving a selection of one of the multiple keys respectively corresponding to the multiple letters.

7. The method according to claim 1, wherein the receiving comprises:
receiving the character input information through a remote controller including a plurality of direction keys and a confirm key.

8. The method according to claim 1, wherein the receiving comprises:
receiving the character input information through a touch screen.

9. A device, comprising:
a processor;
a memory for storing instructions executable by the processor;
wherein the processor is configured to:
receive character input information;
determine, based on the character input information, an inputted character and time information associated with an input operation, the time information being one of a key dwell time or a touch operation dwell time of the input operation; and
select a representation form of the inputted character according to the time information and at least one predetermined time threshold value, wherein when the at least one predetermined time threshold value includes a first threshold value and a second threshold value greater than the first threshold value, the processor is further configured to:
determine at least one of a first magnitude relationship between the time information and the first threshold value or a second magnitude relationship between the time information and the second threshold value;
when the time information is smaller than the first threshold value, maintain a representation form of the inputted character;

when the time information is greater than or equal to the first threshold value and is smaller than the second threshold value, switch the representation form of the inputted character; and when the time information is greater than or equal to the second threshold value, switch the representation form of the inputted character, and lock a representation form of a subsequently inputted character to be the switched representation form.

10. The device according to claim 9, the processor being further configured to:

generate the character input information based on a touch operation, the generated character input information including coordinate information of a start point and an end point of the touch operation, the time information including a dwell time of the touch operation corresponding to the end point.

11. The device according to claim 10, the processor being further configured to:

obtain a key identifier corresponding to the start point of the touch operation; and determine the inputted character according to the coordinate information of the start point, the coordinate information of the end point, and a predefined mapping relationship between the key identifier and one or more candidate characters.

12. The device according to claim 11, the processor being further configured to:

when the coordinate information of the start point and the coordinate information of the end point correspond to the same key identifier, determine a first candidate character at a location of the end point as the inputted character; and when the coordinate information of the start point and the coordinate information of the end point respectively correspond to different key identifiers, determine a second candidate character that corresponds to the obtained key identifier corresponding to the start point and that is passed by a touch path between the start point and the end point, as the inputted character.

13. The device according to claim 9, the processor being further configured to:

read out the time information from the character input information.

14. The device according to claim 9, further comprising: a display;

wherein the processor is further configured to:

display a keyboard on the display, a first key on the keyboard corresponding to one number and multiple letters;

receive a selection of the first key;

display, in response to the selection, multiple keys respectively corresponding to the multiple letters around a key corresponding to the number in a predetermined layout; and receive a selection of one of the multiple keys respectively corresponding to the multiple letters.

15. The device according to claim 9, further comprising:

a remote controller including a plurality of direction keys and a confirm key, wherein the processor is configured to receive the character input information through the remote controller.

16. The device according to claim 9, further comprising:

a touch screen, wherein the processor is configured to receive the character input information through the touch screen.

17. A non-transitory computer-readable medium having stored therein instructions that, when executed by a processor of a device, cause the device to perform an input method, the input method comprising:

receiving character input information;

determining, based on the character input information, an inputted character and time information associated with an input operation, the time information being one of a key dwell time or a touch operation dwell time of the input operation; and selecting a representation form of the inputted character according to the time information and at least one predetermined time threshold value, wherein when the at least one predetermined time threshold value includes a first threshold value and a second threshold value greater than the first threshold value, the selecting of the representation form of the inputted character includes:

determining at least one of a first magnitude relationship between the time information and the first threshold value or a second magnitude relationship between the time information and the second threshold value;

when the time information is smaller than the first threshold value, maintaining a representation form of the inputted character;

when the time information is greater than or equal to the first threshold value and is smaller than the second threshold value, switching the representation form of the inputted character; and when the time information is greater than or equal to the second threshold value, switching the representation form of the inputted character, and locking a representation form of a subsequently inputted character to be the switched representation form.

* * * * *